G. Dryden.
Railroad Turn Table.
N° 5,742.  Patented Aug. 29, 1848.
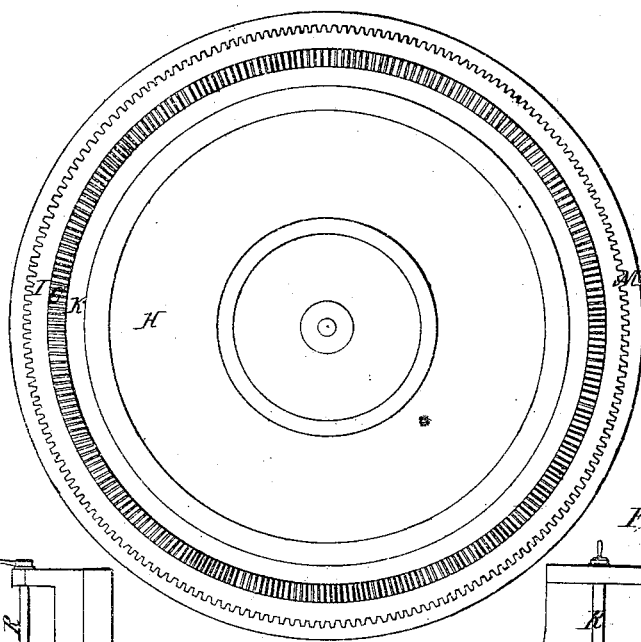
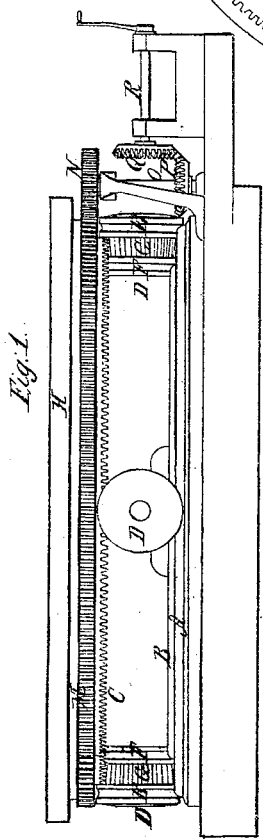
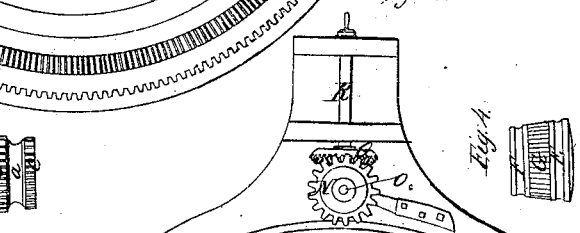
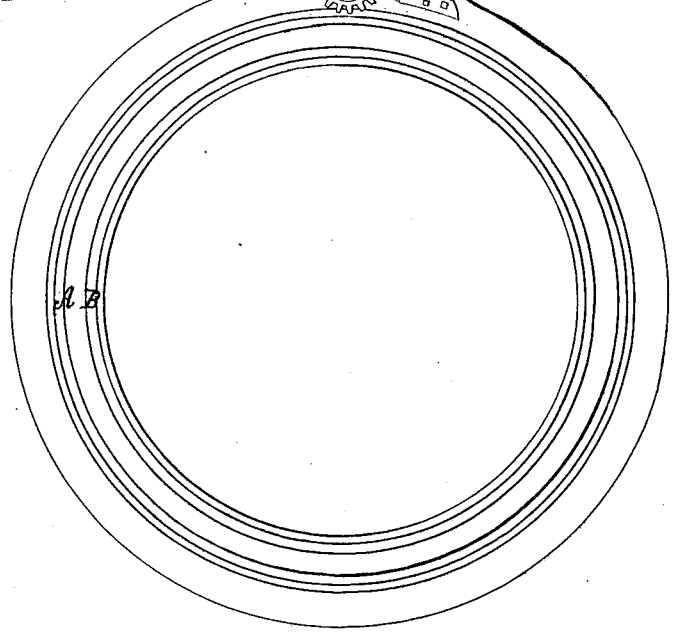

UNITED STATES PATENT OFFICE.

GEORGE DRYDEN, OF WORCESTER, MASSACHUSETTS.

TURN-TABLE.

Specification of Letters Patent No. 5,742, dated August 29, 1848.

*To all whom it may concern:*

Be it known that I, GEORGE DRYDEN, of Worcester, in the county of Worcester and State of Massachusetts, have invented a new and useful Improvement in Turn-Tables for Railways; and I do hereby declare that the same is fully described and represented in the following specification and accompanying drawings, letters, figures, and references thereof.

Of the said drawings, Figure 1, exhibits a side elevation of my improved turning table. Fig. 2, is a top view of its bearing rails or circular railways. Fig. 3, is a view of the underside of the turning platform, exhibiting its bearing rails, and turning racks. Fig. 4, is a top view of one of the conic frustra on which the table rests. Fig. 5, is a modification of the same.

In said figures, A, B, denote two circular rails placed concentrically to each other. D, D, D, exhibit three conical frustra, each being composed of two bearing wheels E, F, and a cogged wheel G, between them. The said frustra are placed so that their wheels E, F, rest and roll on the rails A, B. H is the turn table or platform, to the underside of which are applied two circular rails I, K, and a cogged endless rack, C. The table is kept in place by a spindle or center post in which it revolves. It rests and moves on the conic frustra, and is rotated by a cogged wheel or range of cogs M, which gear into a pinion N, or a shaft O, said shaft being put in motion by the beveled wheels P, Q, and crank shaft R.

In Fig. 5, I have exhibited a modification of the conic frustrum: It is composed of one wheel *a*, and two bevel gear wheels *b*, *c*, made to run on one supporting railway, and to engage with two circular racks applied to the platform or turning table. The bearing rails A, B, I, K, should have their bearing surfaces disposed in flat cones which will admit of the conic frustra, rolling around upon them in a correct manner and without any tendency to roll off them.

Although I have exhibited but three conic frustra in the drawings, yet I use four or any other suitable number of them as circumstances may require. If necessary there may be a circular rack of teeth, arranged between the rails A, B, and made to engage with the cogged wheels G, G, of the frustra D, D.

What I claim as my invention is—

The combination of circular bearing rails A, B, the wheels E, E, cogged pinion or gear G, G, applied to the cogged wheel C, either applied to the platform H, or between the rails A, B, as specified, and the bearing rails I, K, as arranged and applied to the turning table and made to operate together substantially as specified.

In testimony whereof I have hereto set my signature, this twenty ninth day of September, A. D. 1847.

GEORGE DRYDEN.

Witnesses:
    S. B. I. GODDARD,
    JAS. P. DRYDEN.